US008554796B2

(12) United States Patent
Narain et al.

(10) Patent No.: US 8,554,796 B2
(45) Date of Patent: Oct. 8, 2013

(54) QUERY-BASED SEMANTIC ANALYSIS OF AD HOC CONFIGURATION LANGUAGES FOR NETWORKS

(75) Inventors: Sanjai Narain, Madison, NJ (US); Gary Levin, Bedminster, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 25 days.

(21) Appl. No.: 12/837,642

(22) Filed: Jul. 16, 2010

(65) Prior Publication Data

US 2012/0016909 A1 Jan. 19, 2012

(51) Int. Cl.
*G06F 7/00* (2006.01)
*G06F 17/30* (2006.01)

(52) U.S. Cl.
USPC .......................................... 707/791; 707/802

(58) Field of Classification Search
USPC ................................................. 707/802, 791
See application file for complete search history.

(56) References Cited

U.S. PATENT DOCUMENTS

| 5,414,812 | A * | 5/1995 | Filip et al. ...................... 707/694 |
| 5,701,400 | A * | 12/1997 | Amado ........................... 706/45 |
| 2002/0188643 | A1 * | 12/2002 | Kennedy ........................... 709/1 |
| 2005/0005266 | A1 * | 1/2005 | Datig ............................. 717/136 |
| 2005/0273771 | A1 * | 12/2005 | Chang et al. ................... 717/136 |
| 2009/0252163 | A1 * | 10/2009 | Biswas ........................... 370/390 |
| 2010/0153322 | A1 * | 6/2010 | Mandelbaum et al. ......... 706/14 |
| 2011/0282862 | A1 * | 11/2011 | Loeb et al. ..................... 707/710 |

OTHER PUBLICATIONS

Narain, S., et al., "Declarative Infrastructure Configuration Synthesis and Debugging", Journal of Network Systems Management, vol. 16, Issue 3, 2008, pp. 235-258.
Hamed, H., et al., "Modeling and Verification of IPSec and VPN Security Policies", Proceedings of IEEE International Conference on Network Protocols, Nov. 2005.
Hughes, G., et al., "Automated Verification of XACML Policies Using a SAT Solver", Workshop Proceedings of the 7th International Conference on Web Engineering, Workshop on Web Quality, Verification and Validation (WQVV 2007), Como, Italy, Jul. 16-20, 2007, pp. 378-392.
Mandelbaum, Y., et al., "PADS/ML: A Functional Data Description Language", ACM Symposium on Principles of Programming Language, Nice, France, Jan. 17-19, 2007.

* cited by examiner

*Primary Examiner* — Kimberly Wilson
*Assistant Examiner* — Hexing Liu
(74) *Attorney, Agent, or Firm* — Lowenstein Sandler LLP

(57) ABSTRACT

A method is provided for analyzing the semantic content of network configuration files, comprising the steps of accessing configuration files associated with corresponding network components, the files containing commands that define the configuration of those components; transforming the commands into a structural database based, at least in part, on a non-grammatical analysis of the commands, wherein the structure of the commands is represented as the structural database; and constructing a semantic database of the configuration files by querying the structural database.

20 Claims, 2 Drawing Sheets

New Solution

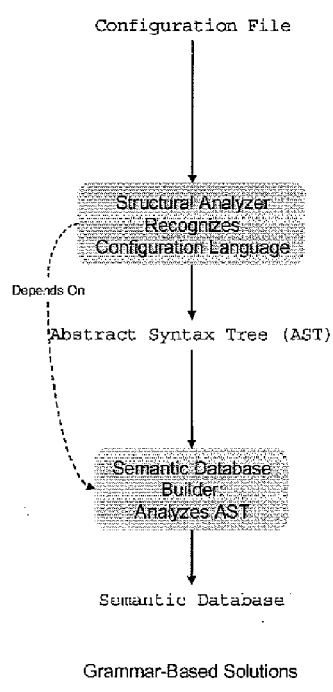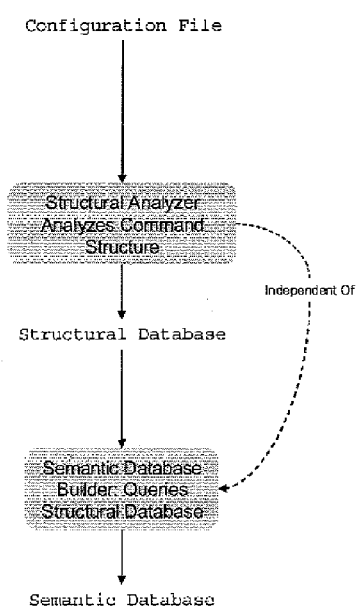
Grammar-Based Solutions
Prior Art
Fig. 1
New Solution
Fig. 2

QUERY-BASED SEMANTIC ANALYSIS OF AD HOC CONFIGURATION LANGUAGES FOR NETWORKS

STATEMENT REGARDING FEDERALLY SPONSORED RESEARCH

Funding for research was partially provided by Air Force Rome Laboratories (AFRL) under federal contract FA8750-07-C-0030. The federal government has certain rights in this invention.

BACKGROUND

1. Technical Field

The present invention relates to the analysis of ad hoc configuration languages for validation of an Internet protocol ("IP") network configuration.

2. Description of the Related Art

Each network component has associated with it a configuration file containing commands that define that component's configuration. Different vendors offer syntactically different configuration languages. However, the semantic information stored in these files is the same. This information is about the logical relationships and structures associated with standardized protocols. This information needs to be extracted from files and stored in a vendor-neutral format. Then, algorithms for validating configurations (i.e., checking whether they are consistent with requirements) can be written just once against this format, instead of once for every combination of vendor configuration language. A common format is a database with a vendor-neutral schema. A schema defines all the tables in a database and the column names and types in each table. This database is called the "semantic database."

There are three basic challenges in the design of a configuration acquisition system. The first is the design of a vendor-neutral database schema for storing configuration information. The second is extracting information from configuration files without knowing the entire configuration language for a given vendor. The third is making the extraction algorithms robust to inevitable changes in the configuration language.

In such systems, the structure of the configuration file is first computed. Then, this structure is analyzed to compute or build the semantic database. As illustrated in FIG. 1, the file structure in these prior art systems is computed by writing a grammar that recognizes the configuration language and produces an abstract syntax tree. This, however, involves a complicated structural analysis algorithm. By definition, grammars recognize languages. Since the content of a configuration file cannot be known in advance, the grammar has to recognize the content of every possible configuration file, i.e., account for every possible protocol and its associated commands. Configuration languages are vast. Only a subset of these associated commands needs to be analyzed for the schema at hand.

To avoid having to recognize a vendor's entire configuration language, previous systems incorporate a pre-processing phase where they remove commands from a file that are not needed for the intended schema. However, a removal logic is hard to design for several reasons. First, it is dependent upon the schema—only the information that will definitely not be needed in any schema table can be deleted. Second, as the schema evolves to analyze new protocols, the removal logic has to be updated—what was irrelevant before may now become relevant. Third, sometimes the removal logic is expressed in the grammar itself. This distorts the grammar idea because grammars are used to specify legal syntax, not illegal syntax. In the absence of a clear guiding principle for writing grammar rules, these rules become prone to error.

A second drawback of previous approaches is the use of algorithmic methods for analyzing the abstract syntax tree to compute the semantic database. Because of the flexibility of ad hoc languages, the different pieces of information to synthesize semantic database tables can be located anywhere in the configuration file. This information has to be searched for based on definite criteria. Such a search is best implemented with a database engine with the criteria specified in a logical language such as SQL or Prolog. Algorithmic methods end up re-implementing the search features of databases, and therefore their complexity increases.

Telcordia IP Assure and PADS/ML systems compute file structure by writing a grammar recognizing the vendor's configuration language and use a parser, generated from this grammar, to construct an abstract syntax tree representing the file's configuration commands. See Y. Mandelbaum, K. Fisher, D. Walker, M. Fernandez, and A. Gleyzer, "PADS/ML: A functional data description language," ACM Symposium on Principles of Programming Language, IP Assure, Telcordia Technologies, Inc. (2007).

IP Assure employs a schema loosely modeled after the Distributed Management Task Force ("DMTF") schemas. It uses the ANother Tool for Language Recognition ("ANTLR") system to define a grammar for configuration files. The parser generated by ANTLR reads the configuration file and, if successful, returns an abstract syntax tree exposing the structure of the file. This tree is then analyzed by algorithms implemented in Java to create and populate tables in its schema. Often, information in a table is assembled from information scattered in different parts of the file.

The IP Assure system can be illustrated in the context of a configuration file containing the following commands in Cisco's IOS configuration language:

```
hostname router1
!
interface Ethernet0
    ip address 1.1.1.1 255.255.255.0
    crypto map mapx
!
crypto map mapx 6 ipsec-isakmp
    set peer 3.3.3.3
    set transform-set transx
    match address aclx
!
crypto ipsec transform-set transx esp-3des hmac
!
ip access-list extended aclx
    permit gre host 3.3.3.3 host 4.4.4.4
```

A configuration file is a sequence of command blocks consisting of a main command followed by a zero or more indented subcommands. The first command specifies the name routers of the router. It has no subcommands. Any line beginning with is a comment line. The second command specifies an interface Ethernet0. It has two subcommands. The first specifies the IP address and mask of this interface. The second specifies the name mapx of an IPSec tunnel originating from this interface. The parameters of the IPSec tunnel are specified in the next command block. The main command specifies the name of the tunnel, mapx. The subcommands specify the address of the remote endpoint of the IPSec tunnel, the set transx of cryptographic algorithms to be used, and the profile aclx of the traffic that will be secured by this tunnel. The next command block defines the set transx as consisting of the encryption algorithm esp-3des and the hash algorithm hmac. The last command block defines the traffic profile aclx as any packet with protocol, source address, and destination address equal to gre, 3.3.3.3, and 4.4.4.4, respectively.

Part of an ANTLR grammar for recognizing the above file is:

```
commands: command NL (rest=commands|EOF)
    ->^ (COMMAND command $rest?);
command: ('interface') => interface_cmd
    |('crypto')        => crypto_cmd
    |('ip')            => ip_cmd
    |unparsed_cmd;
interface_cmd: 'interface' ID (LEADINGWS interface_subcmd) *
    ->^ ('interface' ID interface_subcmd *)
interface_subcmd:
    'ip' 'address' a1=ADDR a2=ADDR ->^ ('address' $a1 $a2)
    |'crypto' 'map' ID ->^ (CRYPTO_MAP ID)
    |unparsed_subcmd;
```

The first grammar rule states that a command is a sequence of one or more command blocks. The ^ symbol is a directive to construct the abstract syntax tree, whose root is the symbol COMMAND, whose first child is the command block just read, and whose second child is the tree representing the sequence of subsequent command blocks. The next rule states that a command block begins with the keywords interface, crypto, or ip. The symbol => means no backtracking. The last line in this rule states that if a command block does not begin with any of these identifiers, it is skipped. Skipping is done via the unparsed_cmd symbol. Grammar rules defining it skip all tokens until the beginning of the next command block. The last two rules define the structure of an interface command block. ANTLR produces a parser that processes the above file and outputs an abstract syntax tree. This tree is then analyzed to create the tables below. Note that the ipsec table assembles information from the interface, crypto map, crypto ipsec, and ip access-list command blocks.

| ipAddress Table | | | |
|---|---|---|---|
| Host | Interface | Address | Mask |
| router1 | Ethernet0 | 1.1.1.1 | 255.255.255.0 |

| ipsec Table | | | | | |
|---|---|---|---|---|---|
| Host | SrcAddr | DstAddr | EncryptAlg | HashAlg | Filter |
| router1 | 1.1.1.1 | 3.3.3.3 | esp-3des | hmac | aclx |

| acl Table | | | | | |
|---|---|---|---|---|---|
| Host | Filter | Protocol | SrcAddr | DstAddr | Perm |
| router1 | aclx | gre | 3.3.3.3 | 4.4.4.4 | permit |

IP Assure's vendor-neutral schema captures much of the configuration information for protocols it covers. Its skipping idea allows one to parse a file without recognizing the structure of all possible commands and command blocks. However, the idea is quite hard to get right in the ANTLR framework. While an attempt is made to avoid writing a grammar for the skipped part of the language, the only method one can use is to write rules defining unparsed_cmd.

SUMMARY

One objective of the present invention is to provide a system and related method that will take a configuration file as input and produce as output a semantic database for a given vendor-neutral schema, capturing the semantic information in the file.

Another object is to provide a method of computing a semantic database without needing to remove commands.

Yet another object is to provide a method of computing a semantic database in which critical search operations are implemented with a database engine.

A method for analyzing the semantic content of network configuration files of a communication network is provided, comprising electronically accessing configuration files associated with corresponding network components of the network, the files containing commands that define the configuration of those components in the network; transforming, by using a processor, the commands into a structural database based at least in part, on a non-grammatical analysis of the commands, wherein the structure of the commands is represented as the structural database; and constructing a semantic database of the configuration files by querying the structural database.

A structural database is a database equivalent of an abstract syntax tree, restricted to representing just the structural aspects of the input and the lexical features. In the above examples, it has all the tokens of the input, organized into commands and sub-commands. The semantic analysis phase uses this structure to find information based on where it appears within a command or a related sub-command. Having the structure allows the semantic analysis to extract the parts it needs without explicitly skipping the parts it does not know or care about.

In an alternative form, the invention comprises a computer program product, comprising a computer usable medium having a computer readable program code embodied therein, the computer readable program code adapted to be executed to implement a method for generating a report, the method comprising electronically accessing configuration files associated with corresponding network components of the network, the files containing commands that define the configuration of those components in the network; transforming, by using a processor, the commands into a structural database based, at least in part, on a non-grammatical analysis of the commands, wherein the structure of the commands is represented as the structural database; and constructing a semantic database of the configuration files by querying the structural database.

In a preferred embodiment, the method includes using the semantic data base to detect communication network policy violations in the communication network.

It is also preferred that the configuration files are written in an ad hoc language wherein the commands are written in command blocks each comprising a main command followed by subcommands. The subcommands preferably include a series of tokens whose meaning depends on the position of a token relative to keywords.

Still further, each command block preferably is transformed into a tuple or fact with the structure ios_cmd(FileName, MainCommand, ListofSubcommands), and wherein MainCommand and ListofCommands is in the form [Nesting Level|ListofTokens]. "[Nesting Level|ListofTokens]" is Prolog syntax for a list whose first element is NestingLevel and whose remaining elements are the ListOfTokens.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings:

FIG. 1 illustrates the prior art grammar-based solution.
FIG. 2 illustrates the method of the present invention.

DESCRIPTION OF THE EMBODIMENTS

Figure 3:
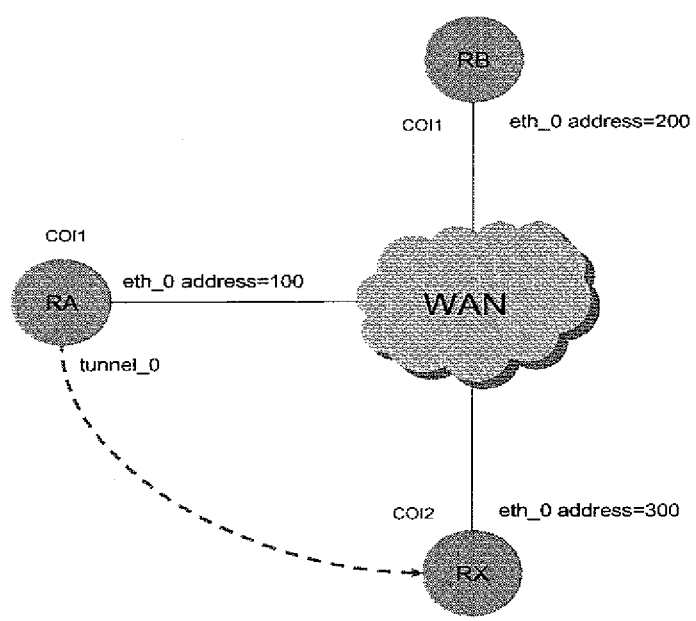
FIG. 3 illustrates network violating security and connectivity requirements.

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other electronic devices or systems.

Reference will now be made in detail to exemplary embodiments of the present invention, examples of which are illustrated in the accompanying drawings. Whenever possible, the same reference numbers will be used throughout the drawings to refer to the same or like parts.

As is illustrated in FIG. 2, the present invention uses a structural analyzer, that may be implemented by executing instructions stored in a computer-readable storage medium on a processor, to create a database of all commands in the file based on the structure, not the grammar, of those commands. The resultant data base is called a structural database and is distinct from the semantic database that is the eventual output. The structural database may be stored in a memory device (not shown) that may include all forms computer-readable storage mediums such as of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks. A semantic database builder queries this database to compute the semantic database.

In accordance with the present invention, computing the structure of the configuration file does not require writing a grammar to recognize the configuration language. According to the invention, it is sufficient to capture the top-level structure of the commands. There is no additional need to check whether each token, command line, subcommand, or block is legal. For example, for Cisco IOS, it is sufficient to simply capture the command blocks in the file with the command lines intact. Cisco's command reference guides are several thousand pages in length. It is impractical and unnecessary to try to understand these in their entirety because many protocols or their features are irrelevant to the given vendor-neutral schema. The solution is robust in the face of additions to the language that are irrelevant to the semantic analysis. If the language is enhanced to include additional representations of information that should be extracted by the semantic analysis, then the semantic analysis will need to be updated to extract the additional possible representations. Further, in accordance with the present invention, the structure of the configuration file is represented as a database. This database may then be queried by a semantic database builder to compute all the rows of vendor-neutral schema tables. For example, this query may be a part of a network validation process, as is disclosed in co-pending application Ser. No. XXXXXX, filed XXXXX, entitled "Verifying Access-Control Policies with Arithmetic Quantifier-Free from Constraints," the contents of which are hereby expressly incorporated herein by reference [APP 1966].

These two aspects of the preferred embodiment of the invention can significantly reduce two types of complexity found in previous approaches. First, there is no removal logic to design or implement. All information in the configuration file may be copied over into the structural database. From this, queries simply may take what is needed to compute the semantic database. Information that is not needed may be ignored by the queries (or the database engine that evaluates queries).

Second, the database more readily handles changes in the configuration language and the vendor-neutral schema. While configuration languages can change, it is rare that the command structure changes. Thus, a structure analyzer used in accordance with the present invention needs almost no changes for new releases of configuration languages. When a new table type is introduced to the schema, one simply writes new queries to populate that table's rows. There is no concern about retaining information that was previously removed.

The present invention preferably can accept as input files written in ad hoc configuration languages. These languages have a very simple structure. For example, a Cisco IOS file is a sequence of command blocks. Each command block contains a main command followed by subcommands. Each command or subcommand is a sequence of tokens whose meaning depends on their position relative to keywords. A main command begins at the first character in a line. Subcommands are indented. With few exceptions, the order in which the command blocks appear in the file or the order in which subcommands appear in a block is immaterial.

More specifically, when the structure of a configuration file is simple, as it is for Cisco's IOS, then it is not necessary to write a grammar with ANTLR or PADS/ML. Instead, the structure can be put into a command database and then queried to construct the semantic database. The query needs to refer only to that part of the command database necessary to construct a given table. All other parts may be ignored. This idea provides substantial resilience to insertion of new command blocks, insertion of new subcommands in a known command block, and insertion of new keywords in subcommands.

This idea is illustrated below using Prolog, although any database engine could be used. Each command block is transformed into an ios_cmd tuple or Prolog fact, with the structure:

ios_cmd (FileName, MainCommand, ListOfSubCommands)

where maincommand and each item in ListOfSubCommands is of the form [NestingLevel|ListOfTokens]. [A|B] means the list with head A and tail B.

For example, the IOS file shown above, named f here, is transformed into the following Prolog tuples:

```
ios_cmd(f, [0, hostname, router1], [ ]).
ios_cmd(f,
    [0, interface, 'Ethernet0'],
    [ [1, ip, address, '1.1.1.1', '255.255.255.0'],
      [1, crypto, map, mapx] ]).
ios_cmd(f,
    [0, crypto, map, mapx, 6, 'ipsec-isakmp'],
    [ [1, set, peer, '3.3.3.3'],
      [1, set, 'transform-set' transx],
      [1, match, address, aclx]]).
ios_cmd(f,
    [0,crypto,ipsec,'transform-set',
        transx,'esp-3des',hmac], [ ]).
ios_cmd(f,
    [0, ip, 'access-list', extended, aclx],
    [ [1, permit, gre, host, '3.3.3.3',
        host, '4.4.4.4']]).
```

Note the close correspondence between the structure of command blocks in the IOS file and associated ios_cmd tuples. One can now write Prolog rules to construct the semantic database. For instance, to construct rows for the ipAddress table, one can use:

```
ipAddress(H, I, A, M):-
    ios_cmd(File, [0, hostname, H|_], _),
    ios_cmd(File, [0, interface, I|_], Args),
    member([ip|SubCmd],Args),
    subsequence([address,A,M],SubCmd).
```

The syntactic convention followed in Prolog is that identifiers beginning with capital letters are variables; otherwise, they are constants. The :- symbol is shorthand for "if." All variables are universally quantified. The rule states that ipAddress of an interface I on host H is A with mask M if there is a File containing a hostname command declaring host H, an interface command declaring interface I, and a subcommand of that command declaring its address and mask to be A and M, respectively.

Note that this definition is unaffected by subcommands of the interface command that are not of interest for computing ipAddress, or that are defined in a subsequent IOS release. It only tries to find a subcommand containing the sequence [ip, address, A, M]. It does not require that the subcommand be in a definite position in the block, or that the sequence address A, M appear immediately after the ip subcommand. Now, where H, I, A, M are variables, the query ipAddress (H, I, A, M) will succeed with the solution H=f, I='Ethernet0', A='1.1.1.1', and M='255.255.255.0'. Here, f is a host, I is an interface on this host, and A and M are its address and mask, respectively.

ipsec is more complex, but querying simplifies the assembly of information from different parts of a configuration file. For each interface, one finds the name of a crypto map Map applied to that interface, and then finds the corresponding crypto map command, from which one can extract the peer address Peer, the filter Filter, and transform-set Transform. These values are used to select the crypto ipsec command from which the Encrypt and Hash values are extracted. Thus, the ipSecTunnel (H, Address, Peer, Encrypt, Hash, Filter) is constructed:

```
ipsec(H, Address, Peer, Encrypt, Hash, Filter):-
    ios_cmd(File, [0, interface, I |_], Args),
    member([_, crypto, map, Map |_], Args),
    ios_cmd(File, [0, hostname, H |_], _),
    ipAddress(H, I, Address, _),
    ios _cmd(File, [0, crypto, map, Map |_], CArgs),
    member([_, set, peer, Peer |_], CArgs),
    member([_, match, address, Filter|_], CArgs),
    member([_, set, 'transform-set',
        Transform |_], CArgs),
    ios_cmd(File, [0, crypto, ipsec,
        'transform-set', Transform, Encrypt, Hash],_).
```

The ipAddress and ipsec tuples are constructed in all possible ways via Prolog backtracking. Together, these form the semantic database for these protocols.

The following example shows how a semantic database formed in accordance with the teachings of the present invention may be utilized with Prolog to specify the types of requirements in an illustrative case study referenced in Section 9.2 of "Network Configuration Validation," Chapter 9 in *Guide to Reliable Internet Services and Applications* (Charles Kalmanek (AT&T), Richard Yang (Yale), and Sudip Misra (IIT) eds., Springer Verlag 2009). The content of Chapter 9 is hereby expressly incorporated by reference herein.

As shown in FIG. 3, routers RA and RB are in the same community of interest ("COI"), but RX is in a different COI. RA's configuration violates two security requirements and one connectivity requirement. First, RA has a GRE tunnel into RX. Second, RA has a default static route, which it can use to forward packets destined to RX, to a Wide Area Network ("WAN"). Third, RA does not have a GRE tunnel into RB. All these violations need to be detected and the configurations need to be repaired accordingly.

A semantic database for the above network is represented by the following Prolog tuples:

```
static_route(ra, 0, 32, 400).
gre(ra, tunnel_0, 100, 300).
ipAddress(ra, eth_0, 100, 0).
ipAddress(rb, eth_0, 200, 0).
ipAddress(rx, eth_0, 300, 0).
coi([ra-coil, rb-coil, rx-coi2]).
```

The first tuple states that router ra has a default static route with a next hop of address 400. Normally, a mask is a sequence of 32 bits containing a sequence of ones followed by a sequence of zeros. In the ipAddress tuple, a mask is represented implicitly as the number of zeros at the end of the sequence. This simplifies the computations needed. The route is called "default" because any address matches it. The second states that router ra has a GRE tunnel originating from GRE interface tunnel_0 with local physical address 100 and remote physical address 300. The third tuple states that router ra has a physical interface eth_0 with address 100 and mask 0. Similarly, the fourth tuple states that router rb has a physical interface eth_0 with address 200 and mask 0, and the fifth tuple states that router rx has a physical interface eth_0 with address 300 and mask 0. The last tuple lists the community of interest of each router. Requirements are defined with Prolog clauses, e.g.:

```
good:-gre_connectivity(ra, rb).
gre_connectivity(RX, RY):-
    gre_tunnel(RX, RY),
    route_available(RX, RY).
gre_tunnel(RX, RY):-
    gre(RX, _, _, RemoteAddr),
    ipAddress(RY, _, RemoteAddr, _).
route_available(RX, RY):-
    static_route(RX, Dest, Mask, _),
    ipAddress(RY, _, RemotePhysical, 0),
    contained(Dest, Mask, RemotePhysical, 0).
contained(Dest, Mask, Addr, M):-
    Mask>=M,
    N is ((2^32-1)<< Mask)/ \Dest,
    N is ((2^32-1)<< Mask)/ \Addr.
bad:-gre_tunnel(ra, rx).
bad:-route_available(ra, rx).
```

The first clause states that good is true provided there is GRE connectivity between routers ra and rb since they are in the same COI. The second clause states that there is GRE connectivity between any two routers RX and RY, provided RX has a GRE tunnel configured to RY and a route available to RY. The third clause states that a GRE tunnel to RY is configured on Rx provided there is a GRE tuple on RX whose remote address is that of an interface on RY. The fourth clause states that a route to RY is available on RX provided an address RemotePhysical on RY is contained within the address range of a static route on RX. The fifth clause checks this containment. << is the left-shift operator and /\ is the bitwise-and operator (not to be confused with the conjunction operator). The sixth clause states that bad is true provided there is a GRE tunnel between ra and rx since ra and rx are not in the same COI. The last clause states that bad is also true provided a route on ra is available for packets with a destination on rx.

We now show how to capture requirements containing quantifiers. To capture the requirement all_good where there is GRE connectivity between every pair of routers in a COI, we can write:

```
all_good:-not(same_coi_no_gre).
same_coi_no_gre:-same_coi(X,Y), not(gre_connectivity(X,Y)).
same_coi(X,Y):-coi(L), member(X-C, L), member(Y-C, L).
```

The first rule states all_good is true provided same_coi_no_gre is false. The second rule states that same_coi_no_gre is true provided there exist X and Y that are in the same COI but for which gre_connectivity (X, Y) is false. The last rule states that X and Y are in the same COI provided there is some COI c such that X-C and Y-C are in the COI association list L.

Similarly, we can capture the requirement no_bad that no router contains a route to a router in a different COI.

The MulVAL system has proposed the use of Datalog for specification and analysis of attack graphs. Datalog is a restriction of Prolog in which arguments to relations are just variables or atomic terms, i.e., no complex terms and data structures. This restriction means, in particular, that predicates such as all_good and all_pairs_gre cannot be specified, and neither can subnet_id since it needs bitwise operations. However, the first five Prolog tuples above and the first three rules can be specified. This restriction, however, permits MuIVAL to perform fine-grained analysis of root causes of configuration errors and to compute strategies for their repair.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for analyzing the semantic content of network configuration files of a communication network, comprising:
   electronically accessing configuration files in a configuration language associated with corresponding network components of said network, said files containing commands that define the configuration of those components in said network;
   transforming, by using a processor, said commands into a structural database without the need for a grammar to understand the complete configuration language without losing any information in the configuration file; and
   constructing a semantic database of said configuration files by querying said structural database where the semantic database captures global relationships between commands in different parts of configuration files.

2. The method of claim 1 including using said semantic database to detect communication network policy violations in said communication network.

3. The method of claim 1 wherein said configuration files are written in an ad hoc language.

4. The method of claim 2 wherein said configuration files are written in an ad hoc language.

5. The method of claim 1 wherein said commands are written in command blocks each comprising a main command followed by subcommands.

6. The method of claim 2 wherein said commands are written in command blocks each comprising a main command followed by subcommands.

7. The method of claim 5 wherein said subcommands include a series of tokens whose meaning depends on the position of a token relative to keywords.

8. The method of claim 6 wherein said subcommands include a series of tokens whose meaning depends on the position of a token relative to keywords.

9. The method of claim 1 wherein each command block is transformed into a tuple or fact with the structure (FileName, MainCommand, ListofSubcommands), and wherein MainCommand and ListofCommands is in the form [Nesting Level|ListofTokens].

10. The method of claim 2 wherein each command block is transformed into a tuple or fact with the structure (FileName, MainCommand, ListofSubcommands), and wherein MainCommand and ListofCornmands is in the form [Nesting Level|ListofTokens].

11. A computer program product, comprising a computer readable storage device having a computer readable program code embodied therein, said computer readable program code adapted to be executed to implement a method for generating a report, said method comprising:
   electronically accessing configuration files in a configuration language associated with corresponding network components of said network, said files containing commands that define the configuration of those components in said network;

transforming, by using a processor, said commands into a structural database without the need for a grammar to understand the complete configuration language without losing any information in the configuration file; and constructing a semantic database of said configuration files by querying said structural database where the semantic database captures global relationships between commands in different parts of configuration files.

12. The computer program product of claim 11 wherein said method includes using said semantic database to detect communication network policy violations in said communication network.

13. The computer program product claim 11 wherein said configuration files are written in an ad hoc language.

14. The computer program product of claim 12 wherein said configuration files are written in an ad hoc language.

15. The computer program product of claim 11 wherein said commands are written in command blocks each comprising a main command followed by subcommands.

16. The computer program product of claim 12 wherein said commands are written in command blocks each comprising a main command followed by subcommands.

17. The computer program product of claim 15 wherein said subcommands include a series of tokens whose meaning depends on the position of a token relative to keywords.

18. The computer program product of claim 16 wherein said subcommands include a series of tokens whose meaning depends on the position of a token relative to keywords.

19. The computer program product of claim 11 wherein each command block is transformed into a tuple or fact with the structure (FileName, MainCommand, ListofSubcommands), and wherein MainCommand and ListofCommands is in the form [Nesting Level|ListofTokens].

20. The computer program product of claim 12 wherein each command block is transformed into a tuple or fact with the structure (FileName, MainCommand, ListofSubcommands), and wherein MainCommand and ListofCommands is in the form [Nesting Level|ListofTokens].

* * * * *